US008179529B1

(12) United States Patent
Berry et al.

(10) Patent No.: US 8,179,529 B1
(45) Date of Patent: May 15, 2012

(54) ALIGNMENT SYSTEMS AND METHODS

(75) Inventors: Ronald W. Berry, Goleta, CA (US);
Richard E. Bornfreund, Santa Barbara, CA (US)

(73) Assignee: Flir Systems, Inc., Wilsonville, OR (US)

( * ) Notice: Subject to any disclaimer, the term of this patent is extended or adjusted under 35 U.S.C. 154(b) by 643 days.

(21) Appl. No.: 12/265,244

(22) Filed: Nov. 5, 2008

(51) Int. Cl.
*G01B 11/00* (2006.01)
(52) U.S. Cl. ........................................ 356/401; 356/399
(58) Field of Classification Search ........... 356/399–401
See application file for complete search history.

(56) References Cited

U.S. PATENT DOCUMENTS

| 6,211,951 | B1 * | 4/2001 | Guch, Jr. | 356/152.1 |
| 6,504,611 | B2 * | 1/2003 | Kogan et al. | 356/399 |
| 7,209,235 | B2 * | 4/2007 | Blidegn | 356/401 |
| 7,365,848 | B2 * | 4/2008 | Raval et al. | 356/401 |
| 7,592,593 | B2 * | 9/2009 | Kauffman et al. | 250/332 |
| 7,602,938 | B2 * | 10/2009 | Prokoski | 382/100 |
| 2003/0189705 | A1 * | 10/2003 | Pardo | 356/401 |

* cited by examiner

*Primary Examiner* — Tarifur Chowdhury
*Assistant Examiner* — Isiaka Akanbi
(74) *Attorney, Agent, or Firm* — Haynes and Boone, LLP

(57) ABSTRACT

Method and systems for aligning a first component with a second component are disclosed. For example, a first component may be aligned with a second component during an assembly process, with a first camera used to facilitate the viewing of one or more alignment features of the first component and/or the second component with infrared energy that is transmitted through the first component. A second camera may be used to view at least a portion of the first component and/or at least a portion of the second component using visible light.

20 Claims, 5 Drawing Sheets

ALIGNMENT SYSTEMS AND METHODS

TECHNICAL FIELD

The present invention relates generally to electronics, and, more particularly, for example, to systems and methods for using one or more cameras for the alignment of components during the fabrication of electronic devices.

BACKGROUND

For certain types of semiconductor device fabrication, it may be desirable to mate one semiconductor device to another, such as by using bump bonding. The mated semiconductor devices may be of the same material or different materials, and are mated to physically attach the devices to each other and/or to provide a large number of electrical interconnects between the mated semiconductor devices (e.g., to allow electrical conduction of signals between the semiconductor devices).

For example, modern state-of-the-art infrared components may use this type of interconnect technology, with one semiconductor device material optimized to perform a detection function (e.g., infrared detector) and the other semiconductor device material optimized to perform detector biasing, signal integration, signal processing, and/or multiplexing functions (e.g., read-out integrated circuit (ROIC)). The interconnect array for these devices physically and electrically interconnects the infrared detector to the ROIC, with the interconnect array typically forming thousands to millions of electrical interconnects.

In a typical approach, metallic contacts (also referred to as bumps) may be formed on pads (contact pads) of each semiconductor device (e.g., substrate) to be electrically connected, and then the semiconductor devices with their respective interconnect contact arrays are precisely aligned to one another. The contacts may be attached to each other using elevated temperatures to melt the contacts into each other and/or using elevated pressures to force solid contacts to bond (e.g., in a process known as a "cold weld"). A drawback of this conventional approach is that the devices must be very precisely aligned to provide proper mating for all of the corresponding contacts in the contact arrays, with the very precise alignment maintained during the thermal exposure cycle (e.g., to prevent the contacts from cross-wetting the adjacent contacts). However, for typical devices (e.g., large pitch devices), coarse alignment may be achieved using visible imagery, but it may be difficult to provide very fine alignment as the devices, such as for typical substrates used in semiconductor processing, are opaque to visible light.

As a result, there is a need for improved techniques for forming interconnects between semiconductor devices.

BRIEF SUMMARY

Systems and methods for aligning components, such as during an assembly process, are disclosed herein in accordance with one or more embodiments of the present invention. For example for an embodiment, two electronic components may be aligned to facilitate bump bonding of the two electronic components to one another.

More specifically in accordance with an embodiment, a method may include viewing an alignment feature of a first component and a second component with an infrared camera, wherein the infrared camera receives infrared energy through at least the first component; and performing a fine alignment of the first component with the second component while viewing the alignment features. The method may further include viewing at least a portion of the first component and the second component with a visible light camera; and performing a coarse alignment of the first component with the second component while viewing at least the portions of the first component and the second component with the visible light camera.

In accordance with another embodiment, a method may include aligning two components that are to be coupled to one another by viewing at least a portion of one component through the other component using infrared energy; and coupling the two components together. The aligning may further include positioning a first component proximate to a second component; viewing alignment features of the first component and the second component using infrared energy that passes through at least a portion of the first component; and moving the first component and/or the second component until the alignment features of the first component are aligned with the alignment features of the second component, as indicated by the viewing based on the infrared energy. The method may further include coarse aligning the first component and the second component with respect to one another by viewing at least a portion of the first component and the second component using images based on visible light.

In accordance with another embodiment, a system may include a first camera configured to view alignment features of a first component and a second component using infrared energy; wherein the infrared energy is transmitted through the first component prior to being viewed by the first camera; and a second camera that is configured to facilitate viewing of at least a portion of the first component and the second component using visible light. The system may further include a fixture for positioning the first component proximate to the second component; and a positioner for moving the first component or the second component with respect to the other until the alignment features of the first component are aligned with the alignment features of the second component, based on images provided by the first camera.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

As examples, systems and methods for facilitating the alignment of components are disclosed in accordance with one or more embodiments. The components may comprise electrical components or any other desired type of components. Such alignment may facilitate bump bonding or other forms of connections between the components, for example.

Figure 1:
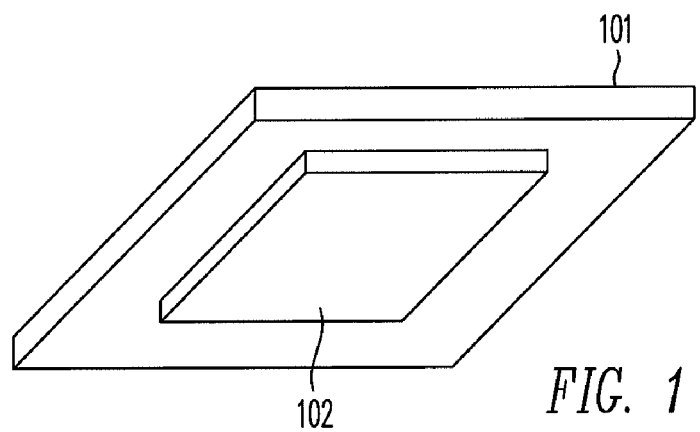
FIG. 1 is a perspective view of a detector and read-out integrated circuit that have been bump bonded to one another, according to an example of an embodiment.
Figure 2:
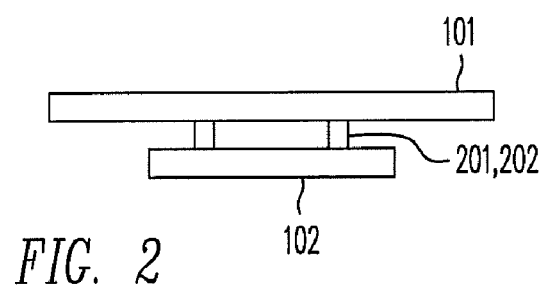
FIG. 2 is a side view of a detector and read-out integrated circuit that have been bump bonded to one another (such as the detector and read-out integrated circuit of FIG. 1), according to an example of an embodiment.

For example referring to FIGS. 1 and 2 in accordance with one or more embodiments, a read-out integrated circuit 101 (e.g., a read-out integrated circuit (ROIC) or other type of semiconductor device) may be aligned with and attached to a detector 102 (e.g., an infrared detector or other type of semiconductor device), such as by bump bonding them to one another. As an example, the detector 102 may be a complementary metal oxide semiconductor (CMOS) imaging detector, an infrared detector, or any other type of detector. Furthermore, it should be understood that this example is not limiting as the methods and systems disclosed herein may be used to attach any desired items to one another. Thus, the discussion herein regarding a detector and read-out integrated circuit is by way of example only, and not by way of limitation. For example, element 101 is referred to as a read-out integrated circuit, but may represent any type of semiconductor device (e.g., including die or wafer) or other type of component, while element 102 is referred to as a detector, but may also represent any type of semiconductor device (e.g., die or wafer) or other type of component, depending upon the desired application.

Figure 3:
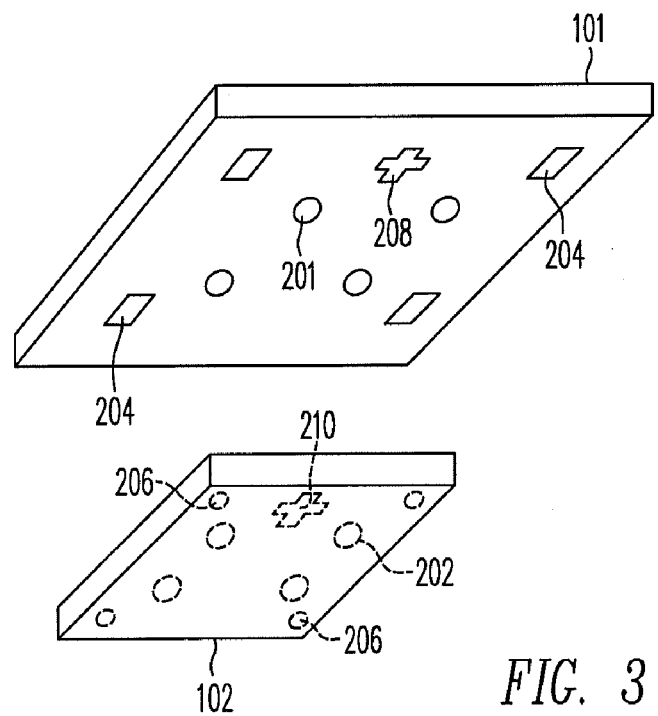
FIG. 3 is a perspective view of a detector and read-out integrated circuit (such as the detector and read-out integrated circuit of FIGS. 1 and 2) that are positioned proximate to one another, such as to facilitate bump bonding to one another, according to an example of an embodiment.

With particular reference to FIGS. 1-3, bumps 201, 202 (e.g., bump bonds or other types of connections) may comprise indium bumps and/or pads that may be aligned and fused together so as to define electrical and/or mechanical connections between the read-out integrated circuit 101 and the detector 102. Such bumps 201, 202 may be fused together by applying pressure and/or heat to the read-out integrated circuit 101 and the detector 102, according to well-known principles.

As shown in FIG. 3, the read-out integrated circuit 101 and the detector 102 may be positioned proximate to one another, such as to facilitate bump bonding to one another. Bumps 201 of the read-out integrated circuit 101 may fuse to bumps 202 of detector 102, for example.

The bumps 201, 202 may comprise indium, copper, any other metal, or any combination of metals. For example, each of the bumps 201, 202 may comprise a raised indium feature that is formed upon a substantially flat aluminum, copper, silver, or gold feature.

Bumps 201, 202 may be formed on both the read-out integrated circuit 101 and the detector 102. Alternatively, bumps 201, 202 may be formed upon either the read-out integrated circuit 101 or the detector 102 and pads may be formed upon the other of the read-out integrated circuit 101 and the detector 102. Indeed, such bumps may be substantially pad-like in structure and such pads may be substantially bump-like in structure. Thus, the distinction between bumps and pads may, at least in some instances, be somewhat unimportant and generally as used herein, the term "bump" and the term "pad" may be used interchangeably. Furthermore, as used herein, the term "bump" may be used to include both a bump and a pad.

Figure 4:
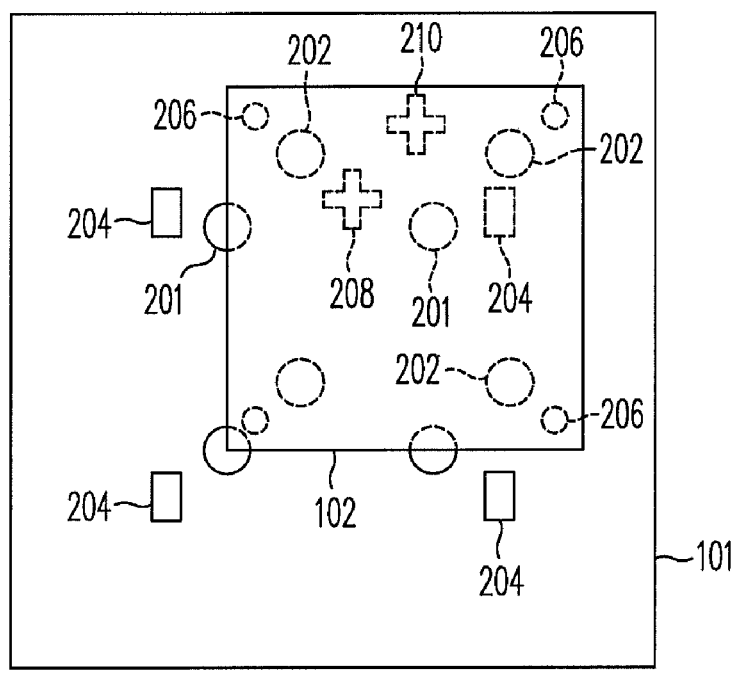
FIG. 4 is a top view of a detector and read-out integrated circuit (such as the detector and read-out integrated circuit of FIGS. 1-3) that are misaligned with respect to one another, such as prior to alignment thereof, according to an example of an embodiment.

Referring now to FIG. 4, the read-out integrated circuit 101 and the detector 102 are misaligned with respect to one another, such as prior to alignment thereof. Thus, the bumps 201 of the read-out integrated circuit 101 and the bumps 202 of the detector 102 are misaligned with respect to one another. As discussed in detail herein, the read-out integrated circuit 101 and/or the detector 102 may be placed onto a stage (such as stage 502 of FIG. 6 as discussed further herein) that facilitates alignment of the bumps 201 of the read-out integrated circuit 101 and the bumps 202 of the detector 102 with respect to one another so as to facilitate bump bonding of read-out integrated circuit 101 to the detector 102.

Figure 5:
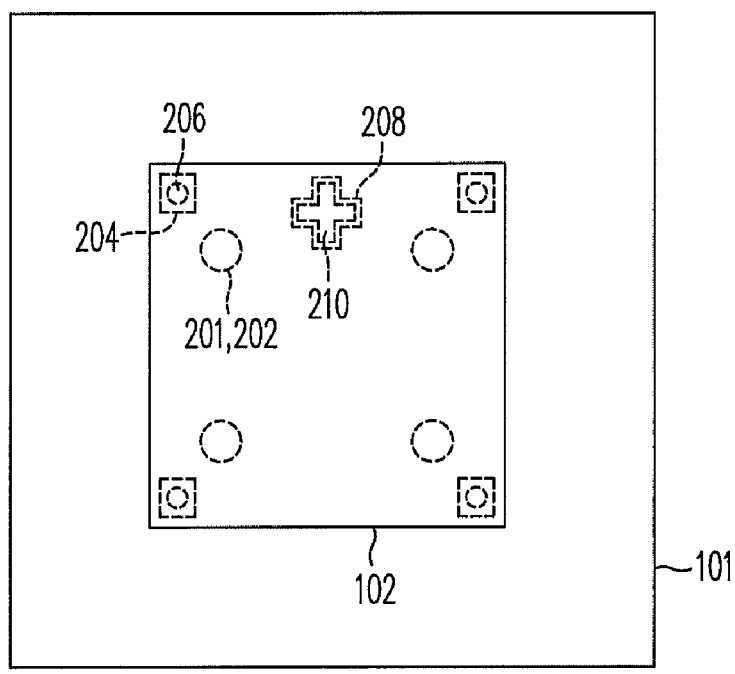
FIG. 5 is a top view of a detector and read-out integrated circuit (such as the detector and read-out integrated circuit of FIG. 4) that are aligned with respect to one another, such as subsequent to alignment thereof, according to an example of an embodiment.

To facilitate alignment of the read-out integrated circuit 101 and the detector 102, alignment features may be implemented as part of these semiconductor devices. For example, the alignment features may be the bumps themselves. Alternatively or in addition as an example in accordance with one or more embodiments, the alignment features may be fiducials, indices, or any type of structure to assist with aligning the components to one another. For example as shown in FIGS. 3-5, nodes 206 (e.g., bumps, nodes, circles, printed dots, or other features) formed upon the detector 102 may cooperate with square fiducials 204 formed upon the read-out integrated circuit 101 such that proper alignment is indicated when the nodes 206 appear to be inside of the squares 204 (e.g., as illustrated in FIG. 5). As another example, alignment marks 210 (e.g., an "x" outline, a "+" outline, or a cross outline) formed upon the detector 102 may cooperate with similar alignment marks 208 formed upon the read-out integrated circuit 101 such that proper alignment is indicated when the alignment marks 210 are within the alignment marks 208 (e.g., as illustrated in FIG. 5).

The alignment features may be of any number and positioned in various areas of the detector 102 and the read-out integrated circuit 101, depending upon the desired application and specific requirements, as would be understood by one skilled in the art. For example, the alignment features may be on a periphery of the components and separate from the bumps or other types of connection features.

As illustrated in FIG. 5, the detector 102 and read-out integrated circuit 101 are shown aligned with respect to one another. Thus, the bumps 201 of the read-out integrated circuit 101 and the bumps 202 of the detector 102 are aligned with respect to one another. It is worthwhile to note that the bumps 201 of the read-out integrated circuit 101 and the bumps 202 of the detector 102 may be substantially obscured from view by the read-out integrated circuit 101 and/or the detector 102. The read-out integrated circuit 101 and/or the detector 102 may be substantially opaque to visible light. Thus, such alignment of the bumps 201 of the read-out integrated circuit 101 and the bumps 202 of the detector 102 generally may not readily be observed using visible light (e.g., except from a limited side view looking between the read-out integrated circuit 101 and the detector 102.

Figure 6:
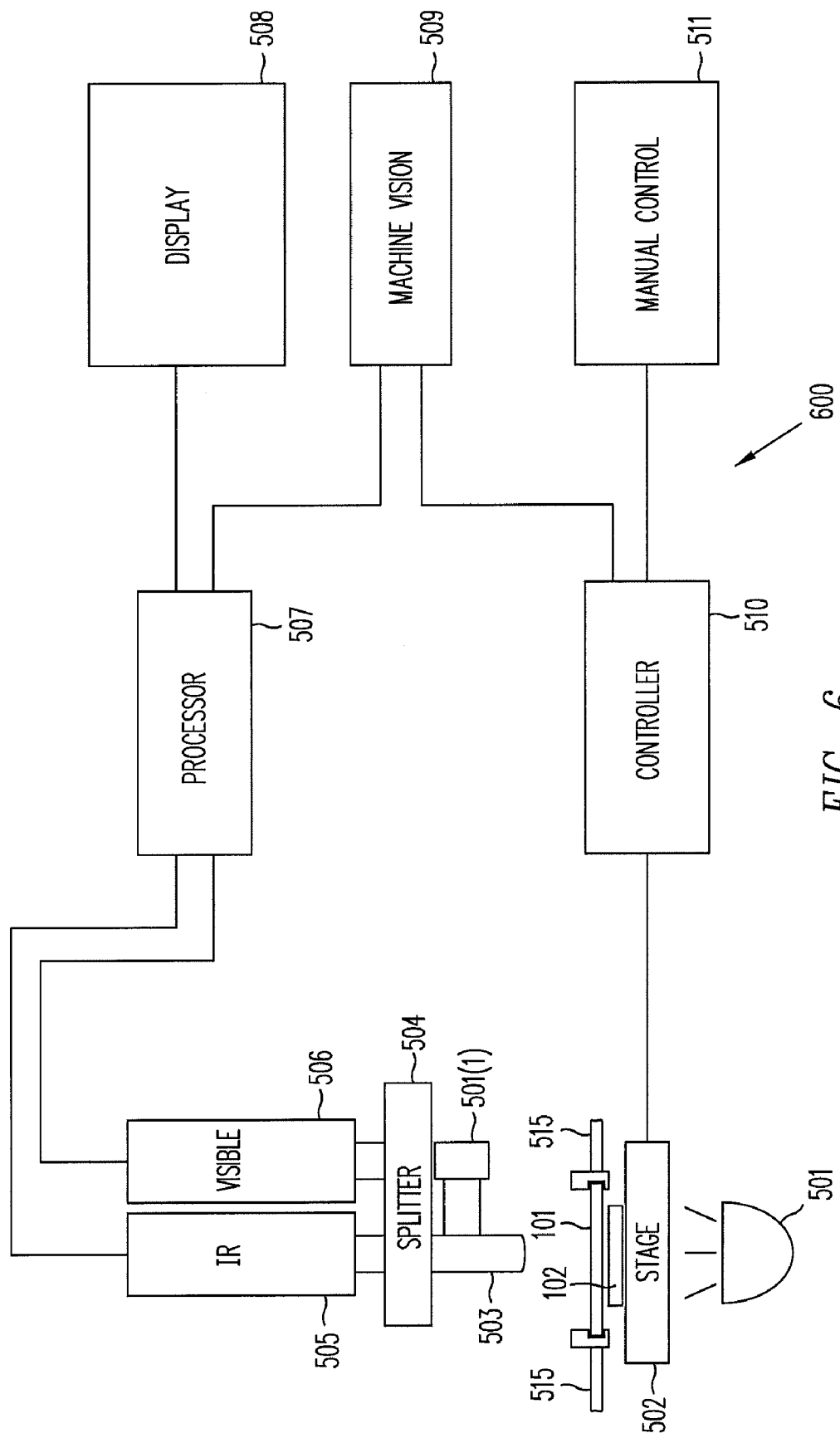
FIG. 6 is a block diagram of an alignment and bump bonding system, according to an example of an embodiment.

Referring now to FIG. 6 in accordance with one or more embodiments, an alignment and bump bonding system 600 is disclosed. System 600 includes an infrared camera 505, a visible light camera 506, and a display 508 for displaying images from infrared camera 505 and/or visible light camera 506, such as during an alignment operation of read-out integrated circuit 101 to detector 102.

A light source 501 (e.g., a visible light and/or an infrared energy source) may be used to provide visible light and/or infrared energy for the system. The light source 501 may be under a stage 502 and/or over the stage 502. For example, the light source 501 may be integrated with optics of a microscope 503 to provide the desired wavelengths of infrared energy. Multiple light sources 501 may be used, if desired.

As a specific example for one or more embodiments, light source 501 may be implemented as light source 501(1) as shown in FIG. 6. Light source 501(1) may provide the desired wavelengths (visible light and/or infrared energy) in line with an optical path of microscope 503, such as with the use of optical devices (e.g., light prisms and/or lenses) incorporated as part of microscope 503 and/or light source 501(1), as would be understood by one skilled in the art. Thus, the desired light and/or infrared energy may be provided through microscope 503 to provide additional illumination during the alignment operation of read-out integrated circuit 101 and detector 102.

The light source 501 may provide visible light and/or infrared energy to the read-out integrated circuit 101 and detector 102. The read-out integrated circuit 101 and detector 102 may be mounted upon stage 502. The light source 501 may provide visible light and/or infrared energy to the read-out integrated circuit 101 and detector 102 through the stage 502 or at least infrared energy through one of the components (e.g., through read-out integrated circuit 101 and/or through detector 102, depending upon their relative positions to light source 501).

The stage 502 may comprise an x-y positioning stage that is configured to effect movement of the read-out integrated circuit 101 and detector 102 with respect to one another. The stage 502 may have the necessary precision so as to effect alignment within a predetermined tolerance. For example, if alignment within a tolerance of 0.003 inch is required, the stage 502 may be capable of movement within a tolerance of 0.001 inch.

The read-out integrated circuit 101 may be held firmly in place with a fixture 515, which may be part of the stage 502 or work in conjunction with the stage 502 to align the read-out integrated circuit 101 to the detector 102, as would be understood by one skilled in the art. The fixture 515 may cover a portion of the read-out integrated circuit 101 or may extend across the read-out integrated circuit 101 to distribute pressures substantially uniformly to the read-out integrated circuit 101. As an example, the fixture 515 may be made of a material (e.g., sapphire) that is transparent to infrared energy and may also be transparent to visible light so as not to inhibit the infrared camera 505 and possibly the visible light camera 506 from obtaining the desired images during the alignment process.

Microscope 503 may facilitate viewing of the read-out integrated circuit 101 and detector 102 so as to facilitate alignment thereof. More particularly, the microscope 503 may facilitate viewing of alignment features or connection features of the read-out integrated circuit 101 and detector 102 so as to facilitate alignment thereof.

The microscope 503 may facilitate imaging of visible light and/or infrared energy. Separate microscopes may be used for the imaging of visible light and/or infrared energy, if desired. Separate objective lenses may be used for imaging of visible light and/or infrared energy, as discussed below.

The microscope 503 may have any desired power. Thus, the microscope may have unitary power, positive power, and/or negative power. Different powers may be used for visible light and infrared energy. Different powers may be used for different sizes or other characteristic of the alignment features.

A splitter 504 may be used to split the image from the microscope 503. The splitter 504 may provide infrared energy to infrared camera 505 and may provide visible light to visible light camera 506. Further, any desired combination of polarization filters, wavelength filters, polarization rotators, or any other optical elements may be used to optically process infrared energy and/or visible light from the read-out integrated circuit 101 and detector 102 prior to imaging the infrared energy and/or visible light. As those skilled in the art will appreciate, such optical processing may enhance an image to better facilitate alignment of the read-out integrated circuit 101 and detector 102. For example, filtering visible light for the infrared camera 505 may enhance the contrast of the infrared image.

The infrared camera 505 may include any type of infrared detector, depending upon the desired application and specific requirements, as would be understood by one skilled in the art. For example, infrared camera 505 may include an indium gallium arsenide (InGaAs) infrared detector adapted to detect wavelengths in a range of approximately 0.85 to approximately 1.7 micrometers. Alternatively or in addition, infrared camera 505 may include an indium antimonide (InSb) infrared detector and/or a Mercury Cadmium Telluride (HgCdTe) infrared detector.

A processor 507 may receive signals representative of the infrared and visible light images from, respectively, the infrared camera 505 and the visible light camera 506. The processor 507 may electronically process the images so as to make the images more useful in the alignment process. For example, the processor 507 may electronically filter the images, electronically magnify the images, change colors of the images, add artificial color to the images, superimpose the visible light and infrared images, integrate a plurality of images, or otherwise enhance the images for storing and/or viewing on display 508.

The processor 507 may provide signals representative of the processed images to display 508. Display 508 may facilitate human viewing of the images. In this manner, a human may manually move the stage 502 so as to effect desired alignment of detector 102 with respect to the read-out integrated circuit 101.

The processor 507 may provide signals representative of the processed images to machine vision system 509. Machine vision system 509 may facilitate automated control of the alignment process. In this manner, a computer or processor of the machine vision system 509 may automatically move the stage 502 so as to effect desired alignment of detector 102 with respect to the read-out integrated circuit 101. Any desired combination of manual and automated control of the stage 502 may be used.

Controller 510 may receive control signals, such as from machine vision system 509 and/or manual control 511. Controller 510 may provide drive signals to the stage 502 (and possibly to the fixture 515) to facilitate desired movement of the detector 102 with respect to the read-out integrated circuit 101.

Manual control (as opposed to machine vision control) of the stage 502 may be implemented either in a purely manual fashion or in an electronic/manual fashion. Manual control may be provided purely manually via the use of mechanical position adjusters, such as micrometer position adjusters or other adjustments on the stage 502 and/or the fixture 515. Manual control may be implemented electronically/manually, for example, via the use of an electronic control, such as a joystick control, that controls movement of the stage.

Figure 7:
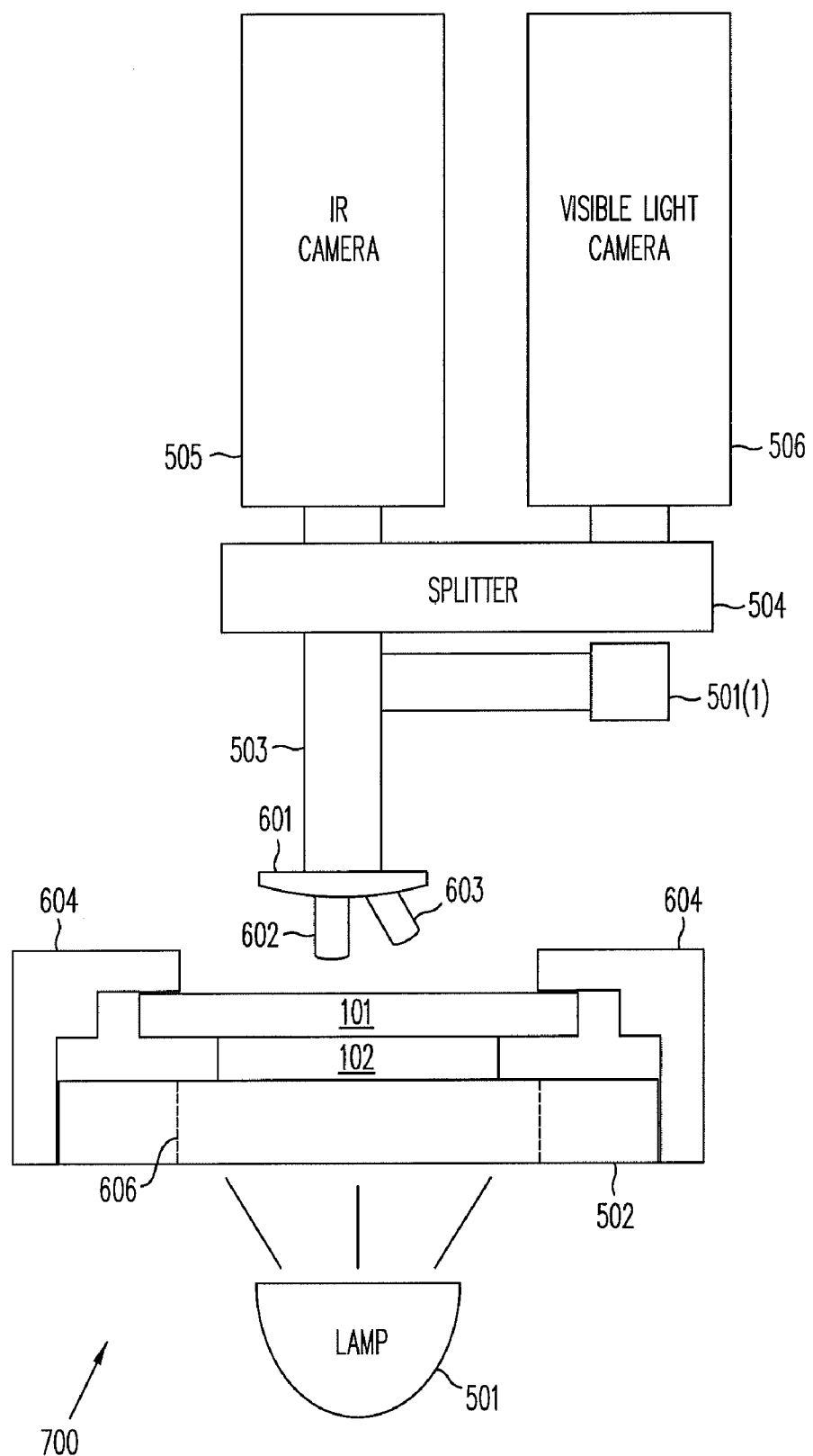
FIG. 7 is an enlarged block diagram of an alignment stage and camera system (such as the alignment stage and camera system of FIG. 6), according to an example of an embodiment.

Referring now to FIG. 7 in accordance with one or more embodiments, an alignment and bump bonding system 700 is disclosed. System 700 may represent a system as described similarly for system 600 (FIG. 6), but may provide additional optional elements and/or additional detail.

For example, the microscope 503 may have a turret objective 601 that facilitates the use of a plurality of separate objective lenses. For example, the turret objective 601 may have one objective lens 602 that is configured for use with visible light and another objective lens 603 that is configured for use with infrared energy.

Pressure and/or heat may be applied to the read-out integrated circuit 101 and the detector 102 so as to effect bump bonding via clamp 604. Clamp 604 may apply such pressure in response to mechanical operation thereof or in response to electrical operation thereof, according to well known principles. Clamp 604 may represent the fixture 515 or may be in addition to the fixture 515 and which secures the read-out integrated circuit 101. Furthermore, the clamp 604 may hold only a portion of the read-out integrated circuit 101 or extend across the read-out integrated circuit 101 to apply pressure uniformly. If present during the alignment process, the clamp 604 may be made of a material transparent to infrared energy and/or visible light, as discussed similarly herein for the fixture 515.

For example, clamp 604 may apply pressure to effect bump bonding of the read-out integrated circuit 101 and the detector 102 in response to a signal from the controller 510 (e.g., under commands from machine vision system 509), wherein the signal is provided when the read-out integrated circuit 101 and the detector 102 are properly aligned with respect to one another (e.g., as sensed by the machine vision system 509). As a further example, clamp 604 may apply pressure to effect bump bonding of the read-out integrated circuit 101 and the detector 102 in response to a signal from manual control 511 (FIG. 6) via the controller 510 (FIG. 6), wherein the signal is provided when the read-out integrated circuit 101 and the detector 102 are aligned with respect to one another as viewed on the display 508 (FIG. 6).

An opening or window 606 may be formed in the stage 502 to facilitate illumination of the read-out integrated circuit 101 and the detector 102 with visible light and/or infrared energy from the light source 501. For example, the window 606 may comprise a material (e.g., sapphire or quartz) that readily transmits both visible light and infrared energy. Alternatively or in addition, the desired infrared energy and/or visible light may be provided via the microscope 503. As a further alternative, the infrared camera 505 may operate as a passive imager and require no active infrared energy source, depending upon the application and specific requirements.

Figure 8:
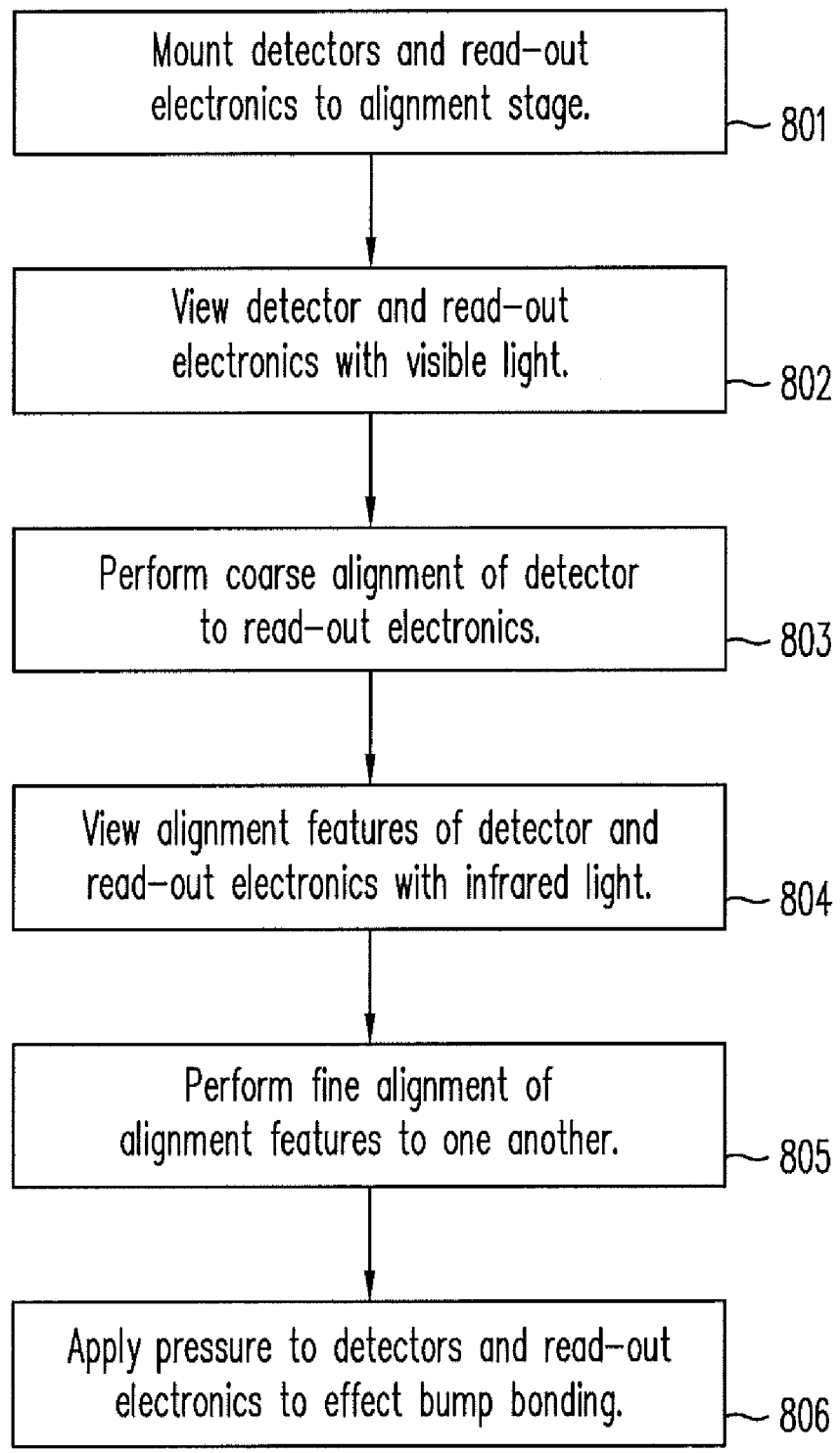
FIG. 8 is a flow chart showing an assembly process for a detector and read-out integrated circuit, according to an example of an embodiment.

Referring now to FIG. 8, a method for bump bonding a semiconductor device to another semiconductor device (such as read-out integrated circuit 101 and detector 102 of FIGS. 1-7) is disclosed in accordance with one or more embodiments. For example, using a read-out integrated circuit and a detector as an example, the method may comprise mounting the read-out integrated circuit and detector to a positioning stage (such as stage 502 and fixture 515 and/or clamp 604 of FIGS. 6 and 7), as indicated in block 801.

The positions of the read-out integrated circuit and detector may be viewed as indicated in block 802. The positions of the read-out integrated circuit and detector may be viewed, by using a microscope and a visible light camera, on a display. The positions of the read-out integrated circuit and the detector may be viewed by a machine vision system. Any desired combination of human viewing and machine viewing may be performed.

Coarse alignment of the read-out integrated circuit and the detector may be performed, as indicated in block 803. Such coarse alignment may be performed manually, automatically (such as using machine vision), or any desired combination of manual and automatic operation.

Such coarse alignment may be performed by placing either the read-out integrated circuit or the detector in a predetermined position with respect to the other of the read-out integrated circuit and the detector. Such coarse alignment may be performed by placing both the read-out integrated circuit and the detector in predetermined positions with respect to the stage or some portion of the stage. Any desired combination of alignment of the read-out integrated circuit and the detector with respect to one another and/or with respect to one or more references may be performed.

After coarse alignment, the read-out integrated circuit and the detector will typically be positioned such that the bumps thereof are close to one another, but are not sufficiently close so as to facilitate proper bump bonding of the read-out integrated circuit to the detector. Therefore, a more precise or fine alignment of the read-out integrated circuit with respect to the detector is desirable.

At this point in the alignment process, alignment features of the read-out integrated circuit and the detector are generally visually obscured from a human observer. The alignment features may be any features of the read-out integrated circuit and/or the detector that facilitate alignment of the read-out integrated circuit and the detector by observing the alignment features. For example, the alignment features may be the bumps themselves. Alternatively, the alignment features may be fiducials, indices, or any type of indicia or structure, as discussed herein (e.g., in reference to FIGS. 3-5).

Infrared energy may be used to image the alignment features. For example, infrared energy from a source (such as light source 501 of FIGS. 6 and 7) may generally be transmitted through the substrates of the read-out integrated circuit and/or the detector, to obtain images of the alignment features thereof.

The wavelength of the infrared energy may be selected so as to provide infrared energy that is readily transmitted through the read-out integrated circuit and/or the detector. For example, the substrate of the read-out integrated circuit and/or the substrate of the detector may be formed of silicon and the wavelength of the infrared energy may be a wavelength that is readily transmitted though silicon. Thus, the alignment features may be readily observed via the use of infrared energy. Other forms of electromagnetic radiation, either visible light or infrared energy, may similarly be used with substrates that are not sufficiently transparent to infrared radiation.

Thus, the positions of the alignment features of the read-out integrated circuit and detector may again be viewed, such as by using a microscope and an infrared camera (as discussed herein), on a display as indicated in block 804. The positions of the alignment features may be viewed by a machine vision system.

Fine alignment of the read-out integrated circuit and the detector may be performed, as indicated in block 805. Such fine alignment may be performed manually, automatically (such as using machine vision), or any desired combination of manual and automatic operation, such as with the aid of the infrared images. For example, the infrared images may show the alignment features of the read-out integrated circuit relative to the detector to allow proper positioning and alignment of the semiconductor devices.

After the alignment features of the detector and the read-out electronics are suitably aligned, then bump bonding may be effected, as indicated in block 806. Bump bonding may be effected by applying pressure to the detector and the read-out integrated circuit so as to cause the corresponding bumps of the detector and the read-out integrated circuit to fuse together, according to well-known principles.

According to an example of an embodiment, a method for aligning a first component with a second component during an assembly process may comprise viewing at least one alignment feature of the first component and/or the second component with infrared energy that is transmitted through the first component. Typically, two or more alignment features of each component may be viewed. For example, two alignment features on diagonally opposed corners of the first component and two alignment features on diagonally opposed corners of the second component may be observed. Any desired number of alignment features on any desired number of components may be observed to facilitate alignment.

The first component and the second component may be viewed with visible light. For example, visible light may be used to facilitate a coarse alignment and infrared energy may subsequently be used to facilitate a fine alignment.

According to an example of an embodiment, a method for bump bonding may comprise aligning two components that are to be bump bonded to one another by viewing at least a portion of one component through the other component using infrared energy. Such viewing may facilitate alignment prior to compressing and/or heating the first component and the second component so as to effect bump bonding.

According to an example of an embodiment, a method for bump bonding may comprise positioning a first component proximate a second component, viewing connection features of at least one of the first component and the second component through the other of the first component and the second component using infrared energy, and moving at least one of the first component and the second component with respect to the other of the first component and the second component until the connection features of the first component are aligned with the connection features of the second component. Any desired combination of infrared energy and visible light may be used to facilitate such alignment.

At least a portion of one of the components may be viewed with infrared energy. At least a portion of one of the components may be viewed with visible light. The portion(s) may be viewed to facilitate alignment. The portion(s) may be viewed to determine if they need to be moved during the alignment process. The alignment features, may be fiducials, indices, or any other feature or indicia. For example, such indicia may comprise circles, squares, triangles, x's, cross-hairs, or any other desired indicial.

The portion(s) viewed to facilitate alignment, e.g., the alignment features, may be the bumps and/or the pads that are to be connected to one another and/or alignment features separate from the connection features (e.g., bumps and/or pads). Thus, the alignment features may be the connection features. The term "alignment feature" and the term "connection feature" may be used interchangeably herein.

Viewing may be performed by human vision. Viewing may be performed by machine vision. Any desired combination of human vision and machine vision may be used. For example, coarse alignment (using either visible or infrared energy) may be performed using human vision and fine alignment (such as using infrared energy) may be performed using machine vision.

In some instances it may only be necessary to view the alignment features of one device, e.g., either the detector or the read-out integrated circuit. This may be the case when the position of the alignment features of the other device are known or may be otherwise established. In other instances, the alignment features of both the first component and the second component may be viewed.

The connection features of both the first component and the second component may be viewed through the first component. The first component and/or the second component may be substantially transparent to the infrared energy. The first component and/or the second component may be substantially opaque to visible light. The second component may be illuminated with the infrared energy so as to facilitate viewing of the connection features of both the first component and the second component.

According to an example of an embodiment, a method for assembling a detector may comprise positioning a detector proximate a read-out integrated circuit for the detector. Connection features of the detector and/or the read-out integrated circuit may be viewed, such as through either the detector or the read-out integrated circuit, by using infrared energy. The detector and/or the read-out integrated circuit may be moved so as to align the connection features of the detector with the connection features of the read-out integrated circuit, as indicated by the infrared images.

According to an example of an embodiment, a system for aligning a first component with a second component during an assembly process may comprise a first camera. The first camera may be configured to view alignment features of the first component and/or alignment features of the second component with infrared energy that is transmitted through the first component and/or the second component. The system may further comprise a second camera that is configured to view the first component and/or the second component with visible light.

According to an example of an embodiment, a system for bump bonding may comprise a first camera that is configured to facilitate aligning two components that are to be bump bonded to one another. At least a portion of one component may be viewed through the other component using infrared energy.

According to an example of an embodiment, a system for bump bonding may comprise a fixture for positioning a first component proximate a second component. A first camera may facilitate viewing connection features of the first component and/or connection features of the second component through the first component and/or the second component using infrared energy.

A positioner may move the first component and/or the second component until the connection features of the first component are aligned with the connection features of the second component, as indicated by the infrared energy. The positioner may comprise at least one actuator or motor. For example, the positioner may comprise electrical actuators or motors, hydraulic actuators or motors, pneumatic actuators or motors, and/or micro electromechanical (MEMS) actuators or motors. The positioner may be a manually operated mechanical positioner, such as a micrometer positioner. Any desired combination of positioners and/or types of positioners may be used.

The fixture and the positioner may cooperate to define a stage, such as an x-y stage that is capable of translation in orthogonal two degrees of freedom. The fixture and the positioner may cooperate to define a stage that is capable of any desired degrees of movement (any desired combination of translation and rotation).

A second camera may facilitate viewing at least a portion of one of the components with visible light. The second camera may be used for coarse alignment and the first camera may be used for fine alignment.

According to an example of an embodiment, a system for assembling a detector may comprise a fixture for positioning a detector proximate a read-out integrated circuit for the detector. A camera may facilitate viewing connection features of at least one of the detector and the read-out integrated circuit through the other of the detector and the read-out integrated circuit using infrared energy. A positioner may facilitate moving at least one of the detector and the read-out integrated circuit with respect to the other of the detector and the read-out integrated circuit until the connection features of the detector are aligned with the connection features of the read-out integrated circuit, as indicated by the infrared energy.

According to an example of an embodiment, a system for aligning a first component with a second component during an assembly process may comprise means for viewing an alignment feature of at least one of the first component and the second component with infrared energy that is transmitted through the first component.

As used herein, the term "bump bonding" may include various different methods for mechanically and/or electrically attaching two components together.

In this manner manufacturing processes may be better automated so as to reduce costs and enhance yield. For example, the read-out integrated circuit may be bump bonded to a detector in a more efficient, accurate, and cost effective fashion.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected is:

1. A method comprising:
   viewing an alignment feature of a first component and a second component with an infrared camera, wherein the infrared camera receives infrared energy through at least the first component;
   performing a fine alignment of the first component with the second component, by moving the first and/or second component relative to each other, while viewing the alignment features; and
   applying pressure and/or heat to the first component and the second component to form electrical interconnects between the first component and the second component.

2. The method as recited in claim 1, further comprising:
   viewing at least a portion of the first component and the second component with a visible light camera; and
   performing a coarse alignment of the first component with the second component while viewing using visible light at least the portions of the first component and the second component with the visible light camera.

3. The method as recited in claim 1, further comprising separately mounting the first component and the second component to an alignment stage adapted to provide positioning for the coarse alignment and the fine alignment to align the first component with respect to the second component.

4. The method as recited in claim 3, wherein the electrical interconnects comprise bump bonds, and wherein the first component is a first semiconductor device and the second component is a second semiconductor device.

5. The method as recited in claim 4, wherein the first component comprises a read-out integrated circuit and the second component comprises an infrared detector, and wherein the infrared camera comprises an InGaAs infrared detector, an InSb infrared detector, or an HgCdTe infrared detector.

6. The method as recited in claim 5, wherein the infrared camera provides images based on infrared energy having wavelengths of at least 0.85 to 1.0 micrometers, wherein the alignment features comprise corresponding bump bonds, fiducials, marks, and/or indices on the first and second components, and wherein the performing the fine alignment is based on an automated operation.

7. A method comprising:
   aligning first and second components that are to be coupled to one another by viewing at least a portion of the second component through the first component using infrared energy, wherein the aligning of the first and second components comprises;
   positioning the first and second components proximate to each other;
   viewing alignment features of the first component and the second component using infrared energy that passes through the first component; and
   moving the first component and/or the second component relative to each other until the alignment features of the first component are aligned with the alignment features of the second component, as indicated by the viewing based on the infrared energy; and
   coupling the two components together.

8. The method as recited in claim 7, wherein the first component is a first semiconductor device and the second component is a second semiconductor device.

9. The method as recited in claim 8, further comprising coarse aligning the first component and the second component with respect to one another by viewing at least a portion of the first component and the second component using images based on visible light.

10. The method as recited in claim 8, wherein the viewing of the alignment features and the moving the first component and/or the second component provide fine alignment of the first component and the second component with respect to one another.

11. The method as recited in claim 8, wherein the viewing is performed by an automated machine vision system.

12. The method as recited in claim 8, wherein the alignment features of both the first component and the second component are viewed, with the coupling providing electrical connections between the first and the second components.

13. The method as recited in claim 8, wherein the infrared energy comprises infrared energy in the range of approximately 0.85 microns to approximately 1.7 micrometers, and wherein the viewing uses an infrared camera having an InGaAs infrared detector, an InSb infrared detector, or an HgCdTe infrared detector.

14. The method as recited in claim 8, wherein the first component comprises a read-out integrated circuit, and wherein the alignment features comprise corresponding bump bonds, fiducials, marks, and/or indices on the first and second components.

15. The method as recited in claim 14, wherein the second component comprises a detector, and wherein the alignment features comprise corresponding bump bonds, fiducials, marks, and/or indices on the first and second components.

16. A system comprising:
a first camera configured to view alignment features of a first component and a second component using infrared energy, wherein, for the alignment features of the second component, the infrared energy is transmitted through the first component prior to being viewed by the first camera, wherein the first camera comprises an infrared camera;
a second camera that is configured to facilitate viewing of at least a portion of the first component and/or the second component using visible light;
a fixture for positioning the first component proximate to the second component; and
a positioner for moving the first component and/or the second component with respect to the other until the alignment features of the first component are aligned with the alignment features of the second component, based on images provided by the first camera, and wherein the fixture and/or the positioner are configured to join the first component to the second component to form electrical interconnects between the first component and the second component.

17. The system as recited in claim 16, wherein the first component is a first semiconductor device and the second component is a second semiconductor device.

18. The system as recited in claim 17, further comprising a machine vision system for monitoring images from the first and second cameras and controlling the positioner to align the first component to the second component.

19. The system as recited in claim 18, further comprising an infrared energy source adapted to direct infrared energy to the first and second components, wherein the first camera comprises an InGaAs infrared detector, an InSb infrared detector, or an HgCdTe infrared detector, and wherein the alignment features comprise corresponding bump bonds, fiducials, marks, and/or indices on the first and second components.

20. The system as recited in claim 17, wherein the second component comprises a detector and the first component comprises a read-out integrated circuit for the detector, and wherein the electrical interconnects form bump bonds between the first component and the second component.

* * * * *